United States Patent [19]

Mizobata et al.

[11] Patent Number: 5,295,008
[45] Date of Patent: Mar. 15, 1994

[54] COLOR LCD PANEL

[75] Inventors: Eishi Mizobata; Yoshihiko Hirai, both of Tokyo, Japan

[73] Assignee: NEC Corporation, Tokyo, Japan

[21] Appl. No.: 926,157

[22] Filed: Aug. 6, 1992

[30] Foreign Application Priority Data

Aug. 7, 1991 [JP] Japan .................................. 3-196910

[51] Int. Cl.$^5$ ............................................. G02F 1/133
[52] U.S. Cl. ....................................... 359/58; 359/54; 359/57; 359/68; 359/87
[58] Field of Search ..................... 359/54, 55, 57, 58, 359/60, 68, 87; 340/719, 784; 257/922; 358/162

[56] References Cited

U.S. PATENT DOCUMENTS 4,712,872 12/1987 Kanbe et al. ........................... 359/58
4,874,234 10/1989 Suzuki ................................... 359/58
5,164,850 11/1992 Tanaka et al. ......................... 359/58

FOREIGN PATENT DOCUMENTS 0011318 1/1991 Japan .................................... 359/58

OTHER PUBLICATIONS

D. R. Baraff, et al., "The Optimization of Metal-Insulator-Nonlinear Devices for Use in Multiplexed Liquid Crystal Displays", IEEE Trans. Electron Devices, vol. ED-28, pp. 736-739, 1981.

Morozumi et al. "A Lateral MIM-LCD with 250×240 Pixels", Technical Reports of the Japanese Television Society (IPD83-8) pp. 39-44, Dec. 1983.

M. Suzuki et al., "A New Active Diode Matrix LCD Using Off-Stoichiometric SiN Layer" Proceedings of the SiD, vol. 28 pp. 101-104, 1987.

Aruga et al., "A 10-in. Diagonal Full color MIM Active Matrix LCD", Proceedings of the 9th IDRC pp. 168-171, 1989.

Primary Examiner—William L. Sikes
Assistant Examiner—Huy Mai

[57] ABSTRACT

A color LCD panel includes a lower substrate, an upper substrate and a liquid crystal which is sealed between the lower substrate and the upper substrate. A plurality of pixels are provided on the lower substrate so as to form a matrix of a plurality of rows and columns. Each pixel includes a substantially rectangular pixel electrode. A plurality of scan driver lines are provided on the lower substrate in the rows in the matrix. Each scan driver line extends in parallel to shorter sides of the rectangular pixel electrodes of the pixels. A plurality of data driver lines of a transparent conductor are formed in the columns in the matrix. Each data driver line extends in parallel to the longer sides of the pixel electrodes of the pixels.

4 Claims, 6 Drawing Sheets

1: TRANSPARENT COUNTER ELECTRODE (UPPER SUBSTRATE)
2: SCAN DRIVER LINE (LOWER SUBSTRATE)
3: NONLINEAR RESISTANCE ELEMENT (LOWER SUBSTRATE)
4: PIXEL ELECTRODE (LOWER SUBSTRATE)
5: LAYER OF SILICON NITRIDE (LOWER SUBSTRATE)
6: CONNECTING TERMINAL (LOWER SUBSTRATE)

1: TRANSPARENT COUNTER ELECTRODE
   (UPPER SUBSTRATE)

2: SCAN DRIVER LINE (LOWER SUBSTRATE)

3: NONLINEAR RESISTANCE ELEMENT
   (LOWER SUBSTRATE)

4: PIXEL ELECTRODE (LOWER SUBSTRATE)

5: LAYER OF SILICON NITRIDE
   (LOWER SUBSTRATE)

6: CONNECTING TERMINAL (LOWER SUBSTRATE)

3: NONLINEAR RESISTANCE ELEMENT
    (LOWER SUBSTRATE)
4: PIXEL ELECTRODE (LOWER SUBSTRATE)
5: LAYER OF SILICON NITRIDE (LOWER SUBSTRATE)
6: CONNECTING TERMINAL (LOWER SUBSTRATE)
7: DATA DRIVER LINE (LOWER SUBSTRATE)
8: TRANSPARENT COUNTER ELECTRODE
    (UPPER SUBSTRATE)

3: NONLINEAR RESISTANCE ELEMENT (LOWER SUBSTRATE)

4: PIXEL ELECTRODE (LOWER SUBSTRATE)

5: LAYER OF SILICON NITRIDE (LOWER SUBSTRATE)

7: DATA DRIVER LINE (LOWER SUBSTRATE)

8: TRANSPARENT COUNTER ELECTRODE (UPPER SUBSTRATE)

COLOR LCD PANEL

BACKGROUND OF THE INVENTION

This invention relates to a color LCD (Liquid Crystal Display) panel, and more particularly to a thin film two-terminal type active matrix color LCD.

The active matrix LCD, in which each pixel unit in an LCD panel is connected in series to a switching element, has rapidly progressed in pixel volume, in response speed, and in high level of contrast. In heretofore disclosed active matrix LCD of trial production, a thin film transistor (TFT) having amorphous Si or poly Si as semiconductor material is used as the switching element.

On the other hand, an active matrix LCD in which thin film two-terminal nonlinear elements (hereafter abbreviated to TFD) are used as the switching elements, is attracting attention from a view of simplification in manufacturing process, high yield rate, and low cost because of its relatively simple structure. This TFD is a nonlinear resistance element.

In these two-terminal element type active matrix LCD (hereafter abbreviated to TFD-LCD), a most promising structure for practical use is an LCD where elements having a metal-insulator-metal structure (hereafter abbreviated to MIM element or MIM) are used. LCD with MIM TFD is hereafter abbreviated to MIM-LCD.

When MIM TFD is connected in series with liquid crystal, the rise time of the changes of "working point of TFD-voltage on liquid crystal-transmission factor of the pixel unit" becomes very sharp because of the strong non-linear character of the voltage to current in TFD.

High speed scanning of the pixel units in LCD can be achieved by this sharp rise time.

MIM-LCD has been disclosed, for example, on "The Optimization of Metal-Insulator-Metal Nonlinear Devices for Use in Multiplexed Liquid Crystal Displays" by D. R. Baraff et al in IEEE Trans. Electron Devices, vol. ED-28 pp 736-739, and on "A Lateral MIM-LCD with 250×240 Pixels" by S. Morozumi et al in Technical Reports of Japanese Television Society (IPD83-8), pp39-44, Dec. 1983.

And a MIM TFD with Silicon Nitride of low dielectric constant as MIM nonlinear elements is disclosed on "A New Active Diode Matrix LCD Using Off-Stoichiometric SiN Layer" by M. Suzuki et al in Proceedings of the SID, Vol. 28 pp 101-104, 1987.

And as for a color LCD, there is disclosed on "A 10-in.-Diagonal Full.Color MIM Active Matrix LCD" by H. Aruga et al in Proceedings of the 9th IDRC, pp 168-171, 1989.

In these prior arts, there are provided a lower substrate and an upper substrate. Liquid crystal is sealed between these two substrates.

A matrix of pixel electrodes are formed on the lower substrate and transparent counter electrodes are formed on the upper substrate. A pixel electrode and a part of the transparent counter electrode facing to this pixel electrode constitute a pixel unit with the liquid crystal between these two electrodes.

Data driver X-lines are formed on the lower substrate, and scan driver Y-lines are formed on the upper substrate. At each cross point of the X-lines and the Y-lines, a nonlinear resistance element is formed with one terminal connected to an X-line and the other terminal connected to a pixel electrode.

The counter electrode facing this pixel electrode is connected to a Y-line on the upper substrate.

When a data voltage is impressed on an X-line, and a scanning voltage is impressed on a Y-line, a two terminal element connected to the X-line and the Y-line is activated.

In a color LCD panel, adjacent three pixel units compose a set of RGB pixel units, and RGB data voltages are respectively impressed on RGB pixel units for color display.

In this structure of MIM-LCD, the X-lines on the lower substrate intercept a fairly large amount of the back light.

And therefore, the intensity of the back light must be maintained at a high level, which means a high power consumption.

SUMMARY OF THE INVENTION

Therefore, a primary object of the present invention is to provide a color MIM-LCD which does not require a high intensity level of the back light.

Another object of this invention is to provide a MIM-LCD which can be operated with high scanning speed. And, for this purpose, the characteristics of the nonlinear resistance element is determined.

Still another object of this invention is to provide means for manufacturing MIM-LCD at a high yield rate.

In a first feature of the present invention, Y-lines are provided on the lower substrate, and a set of three scanning electrodes of a set of RGB pixels is connected in parallel to a common scanning lead conductor through nonlinear resistance elements.

In a second feature of the present invention, X-lines are provided on the lower substrate, and a set of three data electrodes of a set of RGB pixels is connected in parallel to a common X-line through nonlinear resistance elements.

Thus, the total number of Y-lines (or X-lines in the second feature) on the lower substrate is reduced resulting in the reduction of the interception of the back light.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
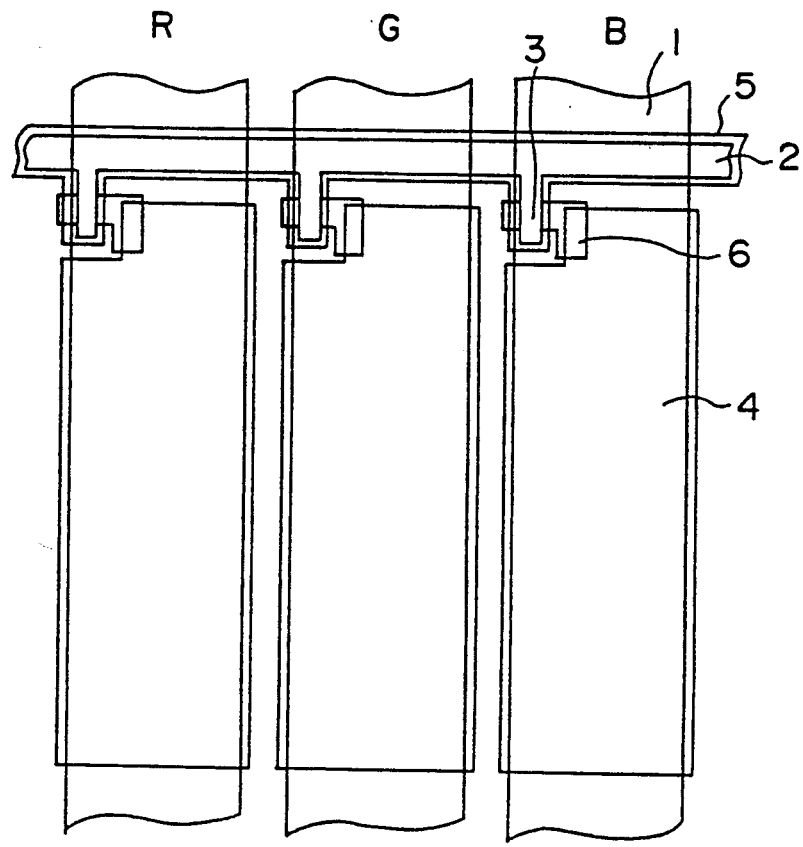
FIG. 1 shows a perspective plan view of a set of RGB pixel units in a first embodiment of the present invention.

In FIG. 1, 1 is a transparent counter electrode formed on an upper substrate, 2 is a scan driver line formed on a lower substrate, 3 is a nonlinear resistance element such as a MIM diode formed on the lower substrate, 4 is a pixel electrode formed on the lower substrate, 5 is a layer of silicon nitride formed on the lower substrate, and 6 is a connecting terminal formed on the lower substrate for connecting the nonlinear resistance element 3 to the pixel electrode 4.

Figure 3:
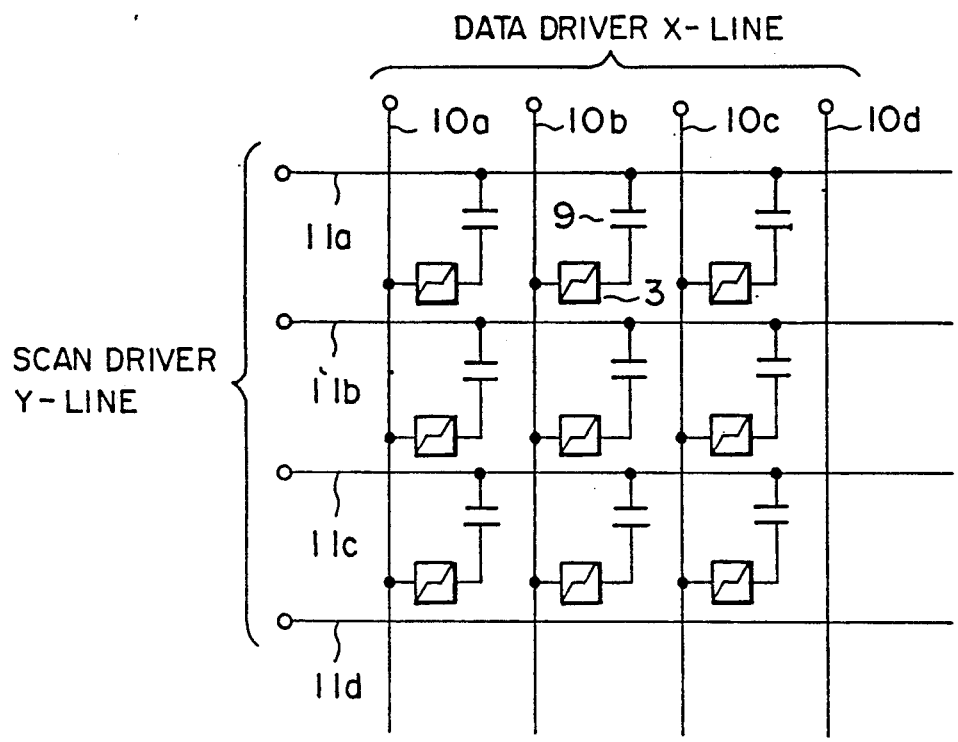
FIG. 3 shows an equivalent circuit of an active matrix in an LCD.

Referring also to FIG. 3 in which an equivalent circuit of an active matrix LCD is illustrated, 9 represents liquid crystal of a pixel unit, $10a$, $10b$, $10c$, . . . are data driver X-lines, and $11a$, $11b$, $11c$, . . . are scan driver Y-lines.

When a data voltage is impressed on an X-line and a scan voltage is impressed on a Y-line, a nonlinear resistance element 3 which lines on the cross point of the X-line and the Y-line is activated.

In FIG. 1, only a set of RGB pixel units in the matrix of pixel units in FIG. 3, is shown with associated nonlinear resistance elements as switching elements.

The transparent counter electrode 1 of FIG. 1 makes the counter electrodes for a column of pixel electrodes 4 of FIG. 3. The scan driver line 2 of FIG. 1 corresponds in structure to a scan driver Y-line of FIG. 3.

Figure 6:
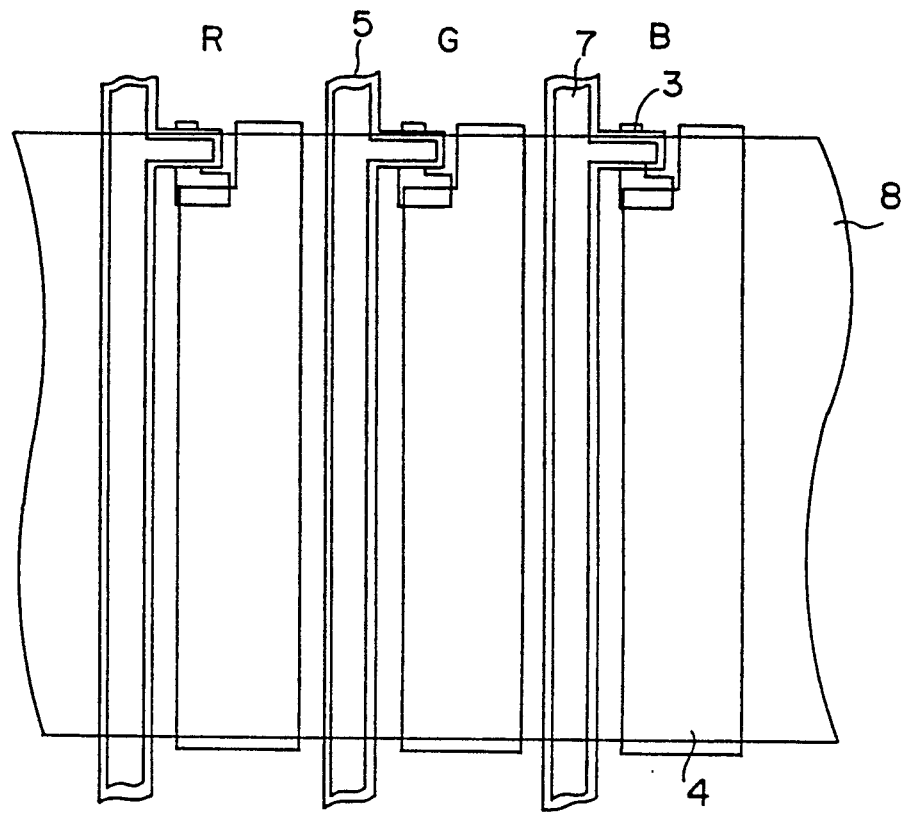
FIG. 6 shows a perspective plan view of a set of RGB pixel units in a heretofore known MIM-LCD for comparison with FIG. 1 and FIG. 2.
Figure 7:
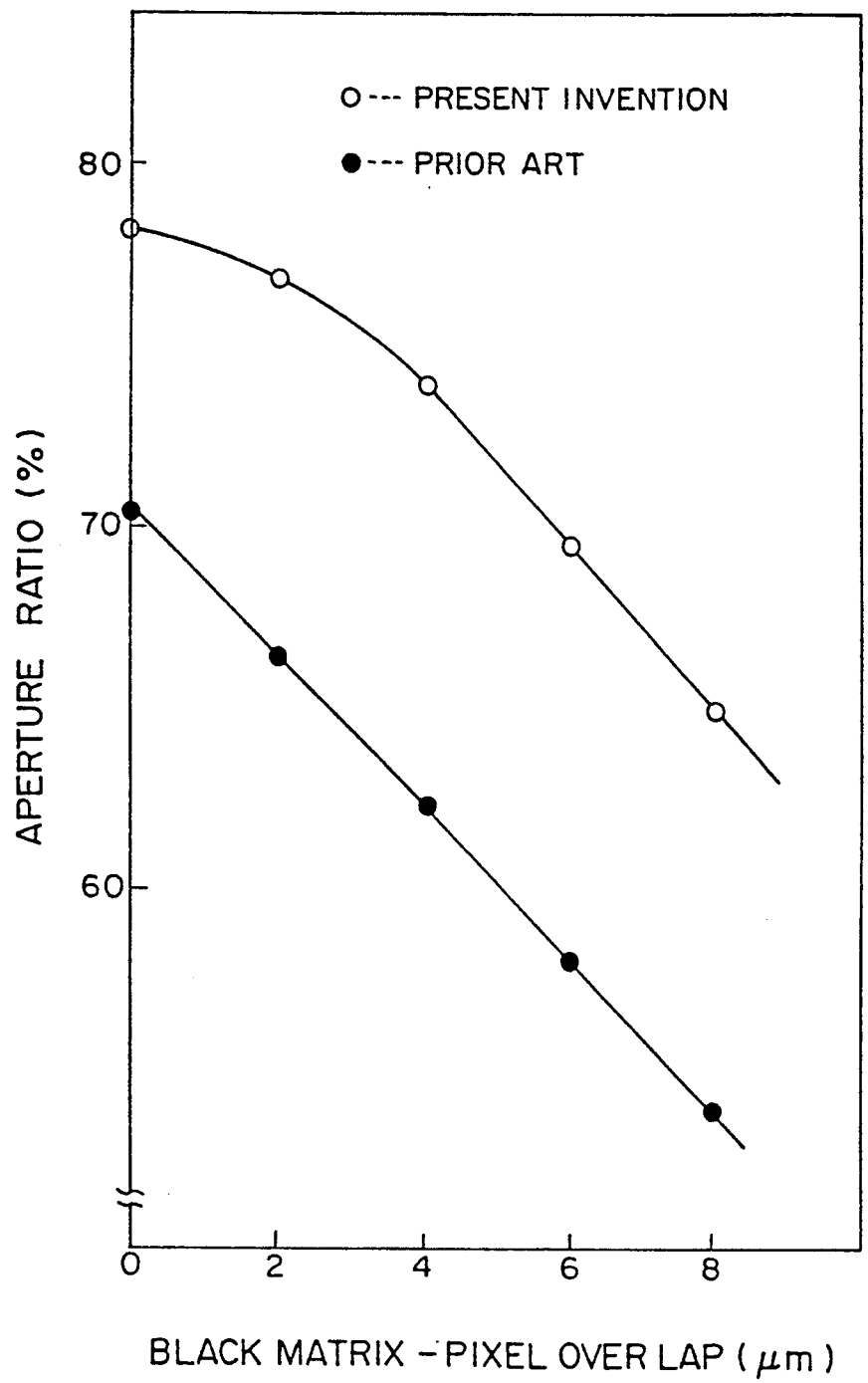
FIG. 7 shows characteristic curves illustrating a merit of this invention.

A plan view in the prior art is shown in FIG. 6, for the sake of comparison to FIG. 1. In FIGS. 6, 7 is a data driver line formed on the lower substrate, and 8 is a transparent counter electrode formed on the upper substrate.

The transparent counter electrode 8 makes the counter electrodes for a row of pixel electrodes 4 of FIG. 3. Although the data driver lines 7 of FIG. 6 are formed on the lower substrate, since they supply signal voltages to the corresponding nonlinear resistance elements 3, the data driver lines 7 correspond functionally to the data driver lines $10a$, $10b$ . . . of FIG. 3.

A data driver X-line on the lower substrate is required for each column of pixels in the prior art of FIG. 6.

The scan driver line 2 of FIG. 1 corresponds in structure to the scan driver Y-line of FIG. 3. The aperture ratio, which is a ratio of the total pixel electrode area to the total panel area becomes larger than that in the prior art. And therefore, a color MIM-LCD with high aperture ratio is obtained with a reduced power consumption of the back light.

Figure 4:
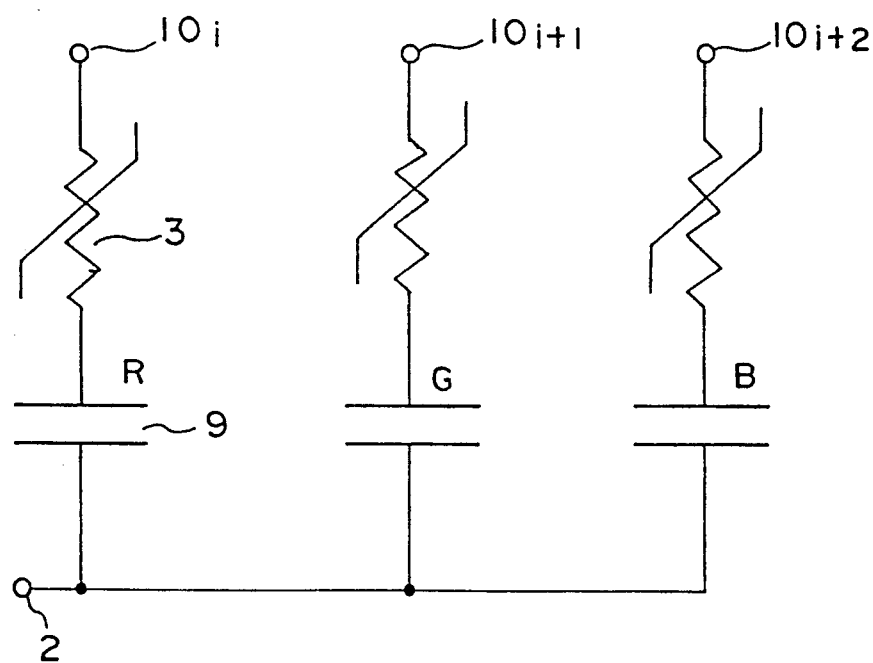
FIG. 4 is an equivalent circuit of FIG. 1.

FIG. 4 is an equivalent circuit of FIG. 1, in which a set of three Y-lines is connected to a common scan driver line 2.

In this circuit of FIG. 4, the data driver X-lines $10_i$, $10_{i+1}$, $10_{i+2}$ are connected respectively to RGB signal voltages, and when the scanning voltage is impressed on the scan driver line 2, the RGB pixel units are simultaneously energized.

To manufacture the fabrication as shown by FIG. 1, glass is used as the lower substrate. Sometimes, the lower glass substrate is covered by a protecting layer such as $SiO_2$, but this process is not indispensible, and is omitted in the embodiments described.

On the lower substrate, Cr of thickness $300 \sim 600$ Angstrom is formed as a lower electrode. The connecting terminals 6 are formed by a conventional lithographic process.

In the next process, the nonlinear resistance elements 3 are formed by using the layer 5 of silicon nitride having a thickness of $800 \sim 2000$ Angstrom which is deposited by a glow-discharge electrolysis in $SiH_4$ and $N_2$ gases.

The silicon nitride layer 5 is patterned by a lithographic method to form the nonlinear resistance elements 3 and the insulating interlayer between the scan driver line 2 and the lower substrate. As an upper electrode on the lower substrate, Cr of thickness 1000 Angstrom is formed and the pattern is made by a lithographic method to form the scan driver lines 2.

For the pixel electrodes 4, Indium Tin Oxide (generally called ITO) film is formed and patterned.

On the upper glass substrate, ITO film is formed and patterned to make a transparent counter electrodes 1. The lower glass substrate and the upper glass substrate are subjected to an orientation treatment and followed by being aligned at nonlinear resistance elements 3 and the transparent counter electrodes 1, and the two substrates are fixed together by adhesives of conventional epoxy resins through a spacer of glass fiber. Thickness of the cell is made to be 5 $\mu$m.

In the last process, TN (Twisted Nematic) liquid crystal is injected and sealed between the two substrates.

Because of the characteristics of the nonlinear resistance element 3 of silicon nitride, voltage between a data driver X-line and a scan driver Y-line appears instantly at the terminals of the liquid crystal 9. And this quick response allows high speed scanning.

Figure 2:
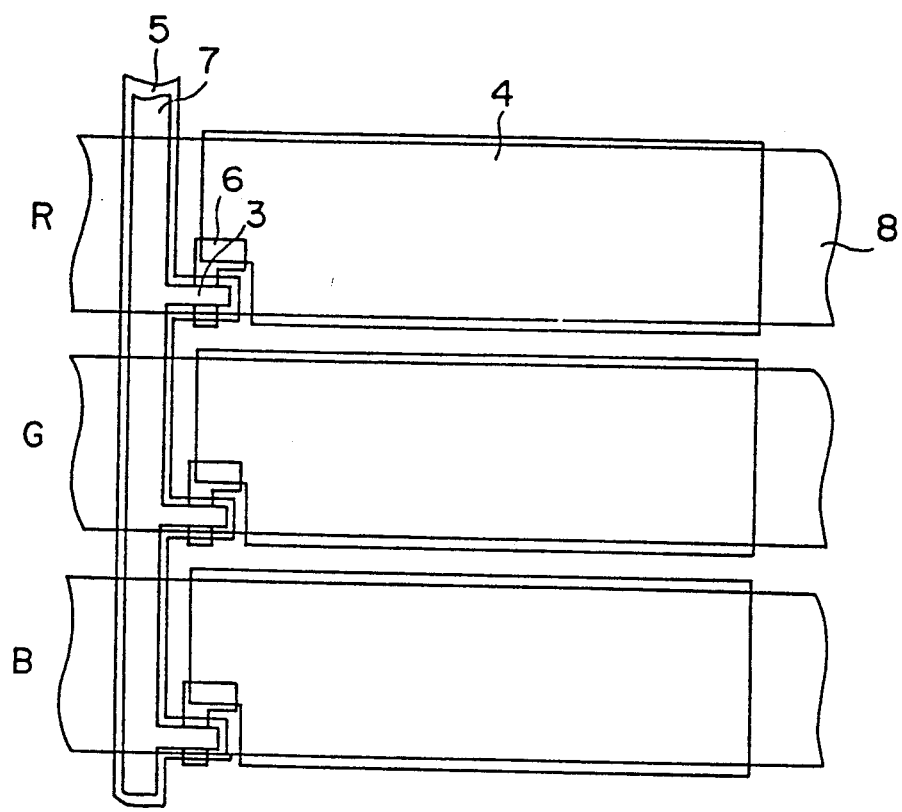
FIG. 2 shows a perspective plan view of a set of RGB pixel units in a second embodiment of the present invention.

FIG. 2 illustrates a second embodiment of the present invention, in which a common data driver line 7 formed on the lower substrate connects a set of data driver X-lines of a set of RGB pixels. Thus, an equivalent circuit of FIG. 2 is shown by FIG. 5, where a set of three X-lines, is connected to a common data driver line 7.

Figure 5:
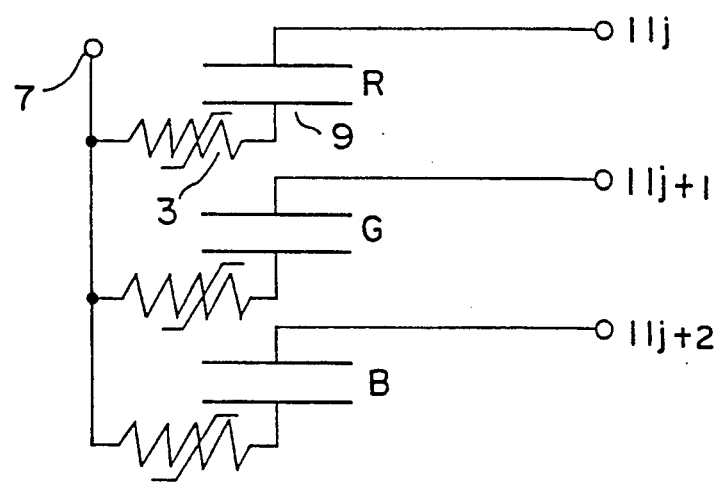
FIG. 5 is an equivalent circuit of FIG. 2.

In the equivalent circuit of FIG. 5, when the scanning voltage is impressed on the scan driver Y-line $11_j$, a data voltage of R intensity is impressed at the data driver line 7, and the pixel unit indicated by R in FIG. 2 is energized. In the next phase, the scanning voltage is impressed on the scan driver Y-line $11_{j+1}$, the voltage on data driver line 7 is changed to G intensity, and the pixel unit indicated by G in FIG. 2 is energized. Thus, in the last phase, the pixel unit indicated by B in FIG. 2 is energized.

To manufacture the fabrication as shown in FIG. 2, glass is used as the lower substrate.

On the lower substrate, Cr of thickness $300 \sim 600$ Angstrom is formed as a lower electrode. The connecting terminals 6 are formed by a conventional lithographic process.

In the next process, the nonlinear resistance elements 3 are formed by using the layer 5 of silicon nitride of thickness $800 \sim 2000$ Angstrom which is formed by a glow-discharge electrolysis in $SiH_4$ and $N_2$ gases.

Then, the silicon nitride layer 5 is patterned by a lithographic method to form the nonlinear resistance elements 3 and the insulating interlayer between the data driver line 7 and the lower substrate. As an upper electrode on the lower substrate, Cr of thickness 1000 Angstrom is formed and the pattern is made by a lithographic method to form the data driver lines 7.

For the pixel electrodes 4, Indium Tin Oxide (generally called ITO) film is formed and patterned.

On the upper glass substrate, ITO film is formed and patterned to make transparent counter electrodes 8. The lower glass substrate and the upper glass substrate are subjected to an orientation treatment and then aligned at nonlinear resistance elements 3 and transparent counter electrodes 8, and the two substrates are fixed together by adhesives of conventional epoxy resins through a spacer of glass fiber. Thickness of the cell is made to be 5 $\mu$m.

In the last process, TN liquid crystal is injected and sealed between the two substrates.

As is apparent from FIG. 1 and FIG. 2 compared to FIG. 6, the total area occupied by the silicon nitride layers 5 is considerably reduced by this invention.

FIG. 7 shows the aperture ratio as a function of black matrix. The curves in FIG. 7 are drawn for 312 $\mu$m $\times$ 312 $\mu$m size of a set of RGB pixels. The difference between the two curves indicates an improvement of the aperture ratio by this invention.

We claim:

1. A color LCD panel comprising a lower substrate, an upper substrate, a liquid crystal sealed between said lower substrate and said upper substrate, a plurality of pixels formed on said lower substrate in a matrix of a plurality of rows and columns, each of said pixels including a pixel electrode and a nonlinear resistance element having a first terminal connected to said pixel electrode and a second terminal, said pixel electrode being of a rectangular shape and defined by a pair of shorter sides and a pair of longer sides perpendicular to said shorter sides, a plurality of scan driver lines formed on said lower substrate in rows of said matrix, each of said scan driver lines being elongated in a direction parallel to the shorter sides of the pixel electrodes of the pixels arranged in a corresponding row and connected in common to second terminals of nonlinear resistance elements of the pixels arranged in said corresponding row, and a plurality of data driver lines made of a transparent conductor and formed on said upper substrate in columns of said matrix, each of said data driver lines being elongated in a direction parallel to the longer sides of the pixel electrodes of the pixels arranged in a corresponding column and having portions facing respectively, via said liquid crystal, the pixel electrodes of the pixels arranged in the corresponding column, said data driver lines being classified into a first group supplied with first information representative of a red color, a second group supplied with second information representative of a blue color and a third group supplied with third information representative of a green color so that three consecutive ones of said pixels arranged in one row constitute one color pixel.

2. The color LCD panel as claimed in claim 1, wherein said nonlinear resistance element is made of a silicon nitride film.

3. A color LCD panel comprising a lower substrate, an upper substrate, a liquid crystal sealed between said lower substrate and said upper substrate, a plurality of pixels formed on said lower substrate in a matrix of a plurality of rows and columns, each of said pixels including a pixel electrode and a nonlinear resistance element having a first terminal connected to said pixel electrode and a second terminal, said pixel electrode being of a rectangular shape and defined by a pair of shorter sides and a pair of longer sides perpendicular to said shorter sides, a plurality of data driver lines formed on said lower substrate in columns of said matrix, each of said data driver lines being elongated in a direction parallel to the longer sides of the pixel electrodes of the pixels arranged in a corresponding column and connected in common to second terminals of nonlinear resistance elements of the pixels arranged in said corresponding column, each of said data driver lines being supplied in a time sharing manner with first information representative of a red color, second information representative of a blue color and third information representative of a green color, and a plurality of scan driver lines made of a transparent conductor and formed on said upper substrate in rows of said matrix, each of said scan driver lines being elongated in a direction parallel to the shorter sides of the pixel electrodes of the pixels arranged in a corresponding row and having portions facing respectively the pixel electrodes of the pixels arranged in said corresponding row, said scan driver lines being classified into a first group supplied with a first scan voltage when said data driver lines are supplied with said first information, a second group supplied with a second scan voltage when said data driver lines are supplied with said second information, and a third group supplied with a third scan voltage when said data driver lines are supplied with said third information so that three consecutive ones of the pixels arranged in one column constitute one color pixel.

4. The color LCD panel as claimed in claim 3, wherein said nonlinear resistance element is made of a silicon nitride film.

* * * * *